Aug. 4, 1953

R. L. DORT 2,647,353

CORN HARVESTING ATTACHMENT FOR VEHICLES

Filed April 27, 1949

INVENTOR.
RUSSELL L. DORT

BY
ATTORNEYS

Aug. 4, 1953   R. L. DORT   2,647,353
CORN HARVESTING ATTACHMENT FOR VEHICLES
Filed April 27, 1949   4 Sheets-Sheet 3

INVENTOR.
RUSSELL L. DORT
BY
ATTORNEYS

Aug. 4, 1953     R. L. DORT     2,647,353
CORN HARVESTING ATTACHMENT FOR VEHICLES
Filed April 27, 1949     4 Sheets—Sheet 4

INVENTOR.
RUSSELL L. DORT
BY
ATTORNEYS

Patented Aug. 4, 1953

2,647,353

UNITED STATES PATENT OFFICE 2,647,353

CORN HARVESTING ATTACHMENT FOR VEHICLES

Russell L. Dort, Davenport, Iowa, assignor to Deere & Company, Moline, Ill., a corporation of Illinois Application April 27, 1949, Serial No. 89,834

28 Claims. (Cl. 56—18)

This invention relates to an agricultural implement attachment for vehicles and is primarily concerned with the provision of improved supporting or mounting structure for mounting a corn harvester or the like on a tractor or similar vehicle.

The invention contemplates and has for its principal object the provision of a row-crop unit that may be conveniently supported on and carried by a mobile frame. The design of such unit is developed around a main support on which the various components of the harvester are mounted and within which a major portion of the drive mechanism is contained. The basic design constitutes a radical departure from constructions heretofore known, of which the conventional one- or two-row corn picker may be considered typical.

In such prior constructions, the usual picker was primarily designed for attachment to a particular type of tractor; although, it has not heretofore been uncommon to provide adapting parts or modification bundles for adapting such picker to other types of tractors. The principal defect in the design of such prior pickers lay in the structural characteristics that involve the provision of relatively complicated framework with which the various components of the picker were inextricably tied together, all of which complicated the design in general to such extent that maximum efficiency could be obtained only in use of the picker with the tractor for which it was fundamentally designed, and even then that efficiency was considerably below what could be expected.

According to the present invention, the main support or backbone of the row unit comprises a casing which contains the several parts of the driving mechanism. This driving mechanism includes a plurality of output shafts which are accessible through walls of the casing. The exterior of the casing is provided in such manner that it has a plurality of attaching or mounting surfaces on which the various components of the implement may be mounted. In the case of the adaptation of the principles of the invention to a corn picker, for example, the snapping and gathering unit may be mounted on one face of the casing, while the husking or crop-receiving means may be mounted on the opposite face. The rotatable components of these two units are then connectible to the output elements of the driving mechanism. The entire arrangement is such that the units may be readily assembled to or separated from the supporting casing. In another aspect of the invention, the supporting casing is mounted on the vehicle—which may be a tractor or a drawn mobile frame—by means of a torque arm which is preferably hollow and which contains a power input shaft connected to an input element for the driving mechanism within the supporting casing.

In addition to the attainment of objects inherent in the design characteristics outlined above, the invention contemplates the provision of an improved and inexpensive agricultural implement, one that may be readily mounted on any type of tractor or other vehicle, and one that may be readily assembled and dismantled, the arrangement of the various components being such that one or the other may be separated without disturbing or materially affecting other components.

The foregoing and other important objects and desirable features inherent in any encompassed by the invention will become apparent to those versed in the art as the disclosure of a preferred embodiment of the invention is made in detail in the following specification and accompanying sheets of drawings in which:

General description

Although the basic principles of the invention are applicable to many types of agricultural implements, particularly those of the harvesting type, the disclosure herein pertains to its embodiment in a row-crop attachment of the corn picker type. In the description and in the claims, reference will be made to the various components as extending forwardly or rearwardly and as having front and rear ends and right and left sides. These terms are used for simplicity and clearness only and should not be taken as in any way limiting the scope of the invention. Reference in the description to right- and left-hand sides means the right and left hands of an observer standing behind the machine and facing forwardly. In connection with the description of the picker as associated with the tractor or equivalent vehicle, the terms "inner" and "outer" have reference to the relationship of the picker components as being proximate to or relatively remote from the vehicle.

The vehicle-mounted corn picker chosen for the purposes of illustration has several components which, fundamentally, are somewhat conventional, and which will be readily recognized. For the purposes of facilitating a quick understanding of the over-all disclosure, the picker may be referred to generally as being of the self-propelled type comprising a vehicle V and a corn picker which includes one or more longitudinally extending row units, each comprising snapping and gathering mechanism S, husking mechanism H, a first elevator F for moving snapped corn from the snapping unit to the husking unit, and a wagon elevator W into which the husked ears are discharged by the husking unit.

Vehicle structure (reference numerals 20–32)

Figures 1, 2, 7:
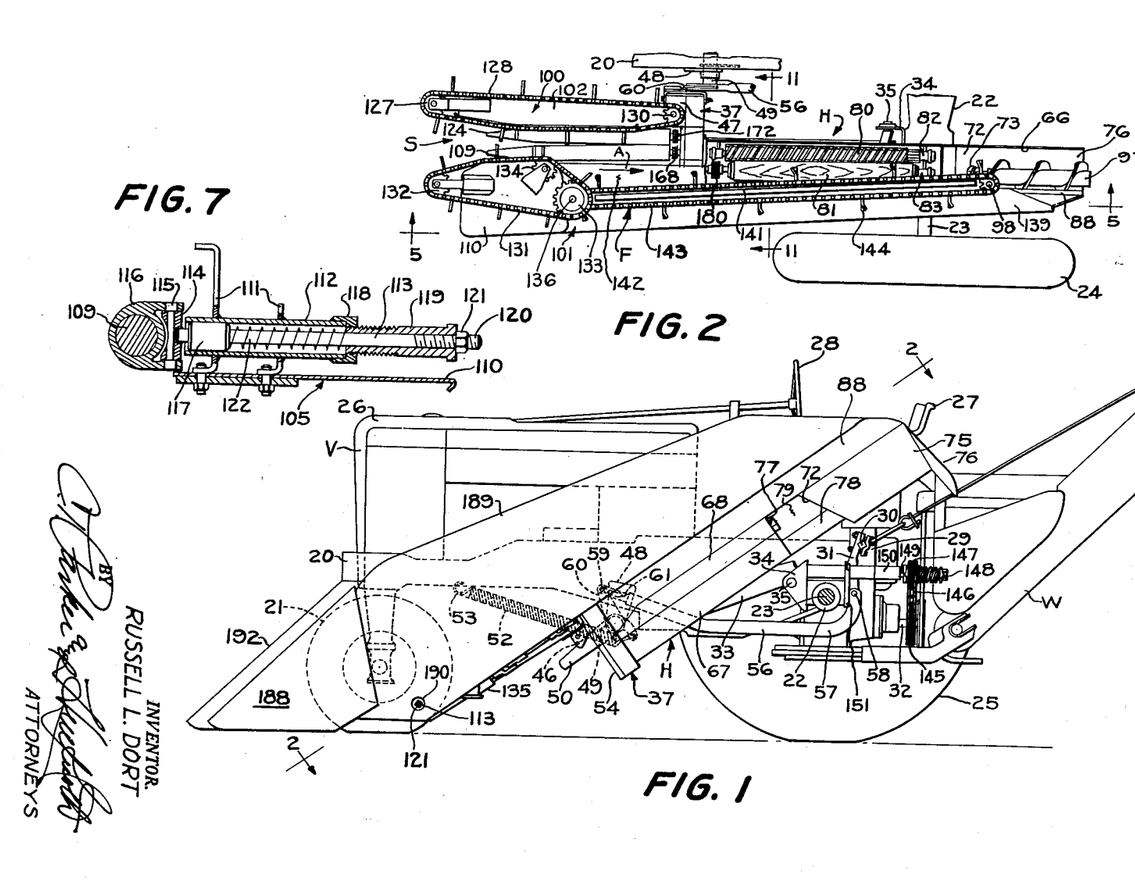
Figure 1 is a side elevational view of a tractor-mounted corn picker, the near rear wheel of the tractor having been omitted to expose the structure therebehind.
Figure 2 is a fragmentary plan view of the structure shown in Figure 1, a portion of the styling or shielding being removed substantially along the line 2—2 of Figure 1.
Figure 7 is an enlarged fragmentary cross sectional view taken substantially on the line 7—7 of Figure 4 and illustrating the manner in which a snapping roll is mounted on the snapping unit frame structure.
Figures 3, 8, 9, 10:
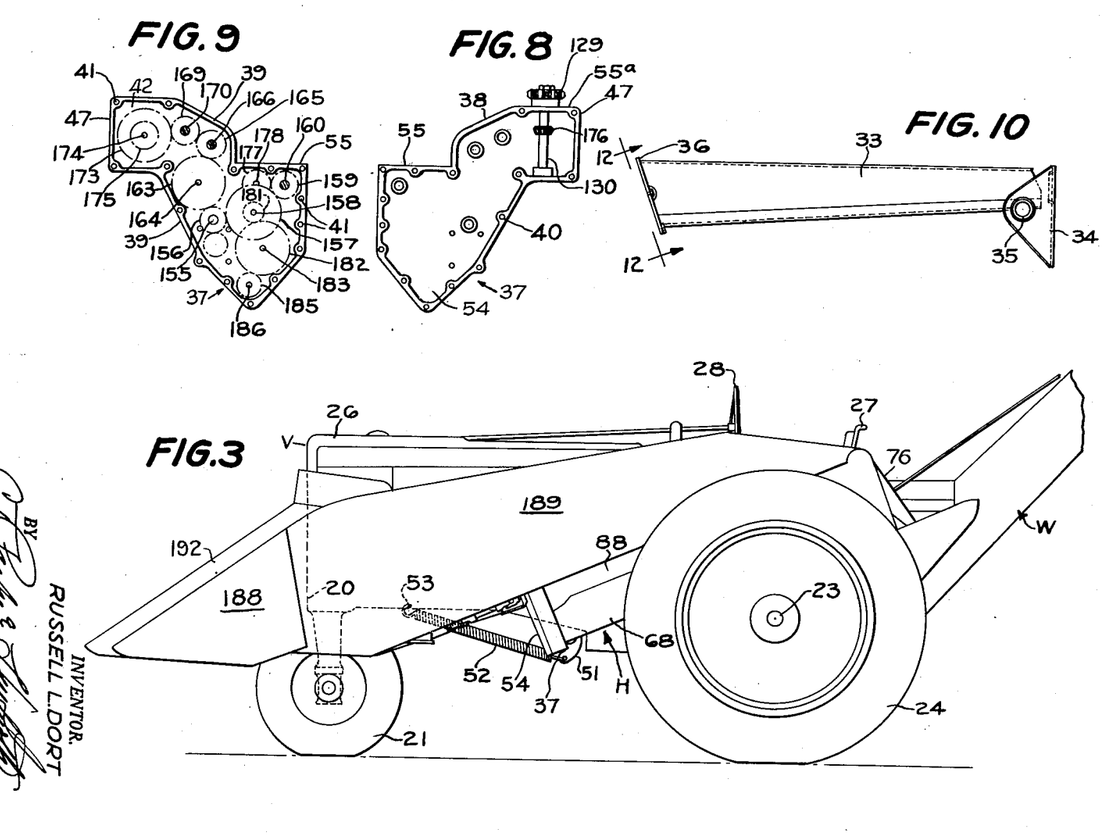
Figure 3 is a side elevational view showing the picker in elevated position with respect to the tractor.
Figure 8 is an enlarged rear face view of the forward half of the supporting casing, as viewed substantially along the line 8—8 of Figure 4.
Figure 9 is an enlarged front face view of the rear half of the supporting casing, a viewed substantially along the line 9—9 of Figure 4.
Figure 10 is an enlarged side elevational view of the support or torque arm, the view being along the line 10—10 of Figure 4.

The vehicle illustrated is representative of a conventional tractor and comprises a longitudinally extending body or frame 20 carried at its forward end on a steerable wheeled truck 21. The rear end of the body 20 is provided with laterally outwardly projecting carrying structure, here in the form of a transverse rear axle housing 22. Only one of such housings is illustrated in the drawings, although it will be understood that a similar housing projects from the opposite side of the tractor. Each housing carries a laterally outwardly extending axle, only that for the left-hand housing 22 being indicated at 23 (Figures 1, 2 and 3). The axle 23 carries at its outer end a rear traction wheel 24 (Figures 2 and 3), and the right-hand axle (not shown) carries at its outer end a similar rear traction wheel 25 (Figure 1).

The longitudinal body 20 is relatively narrow, as is conventional in this type of tractor, and includes a longitudinally extending radiator and engine hood structure 26 which terminates at its rear end just forwardly of an operator's seat 27. A steering wheel 28 is provided for steering the wheeled truck 21.

The tractor illustrated is provided with power lift structure contained within a housing 29 and includes a laterally extending rockshaft 30 to which is rigidly fixed an adjusting arm 31 (Figure 1). The particular type of power lift mechanism referred to is not important in so far as the present invention is concerned and that illustrated could be replaced by any other suitable type.

The tractor is, of course, provided with the usual source of power, such as an internal combustion engine (not shown) from which power is derived for driving a rotatable element in the form of a power take-off shaft 32 (Figure 1).

As will be apparent from the description to follow, the row-crop unit provided according to the present invention may be mounted on a vehicle of a type other than that illustrated and such unit may be readily adapted to any suitable mobile frame, in which event the power source and power lift mechanism will, obviously, be different from that illustrated. However, these details are relatively unimportant.

Main supporting structure (reference numerals 33–55a)

The supporting structure for the row unit that includes the gathering and snapping mechanism S and the husking unit H comprises essentially two main parts. The first of these is in the form of a support or torque arm 33 (Figures 1, 4, 10 and 12). This torque arm is of elongated tubular construction and is positionable lengthwise alongside the tractor body 20, with its rear end proximate to the left-hand portion of the carrying structure or axle housing 22. The rear end of the torque arm is adapted to be carried by the housing structure and the means provided for that purpose comprises a bracket 34, which is rigidly mounted on the axle housing 22, and a transverse pivot pin 35 by means of which the torque arm 33 is connected to the bracket 34 for vertical movement in a longitudinally extending plane.

The forward or front end of the torque arm 33 is flanged at 36 (Figures 10, 11 and 12) to provide a mounting portion for securing of the torque arm rigidly and removably to a second basic support element in the form of a casing or housing 37. As best shown in Figures 8 and 9, the casing 37 is formed of two complementary halves 38 and 39, which are respectively the front and rear halves of the casing. These halves, when assembled, are rigidly held together by a plurality of bolts, the halves being respectively provided with a plurality of bolt holes 40 and 41. Since certain of the bolts that secure the two casing parts together are utilized for other purposes, detailed reference thereto will be deferred.

In the interests of brevity and clarity, the casing 37 will be considered as an integral unit and no further reference will be made to the parts 38 and 39 except in specific instances.

Figures 11, 12, 13, 14, 15:
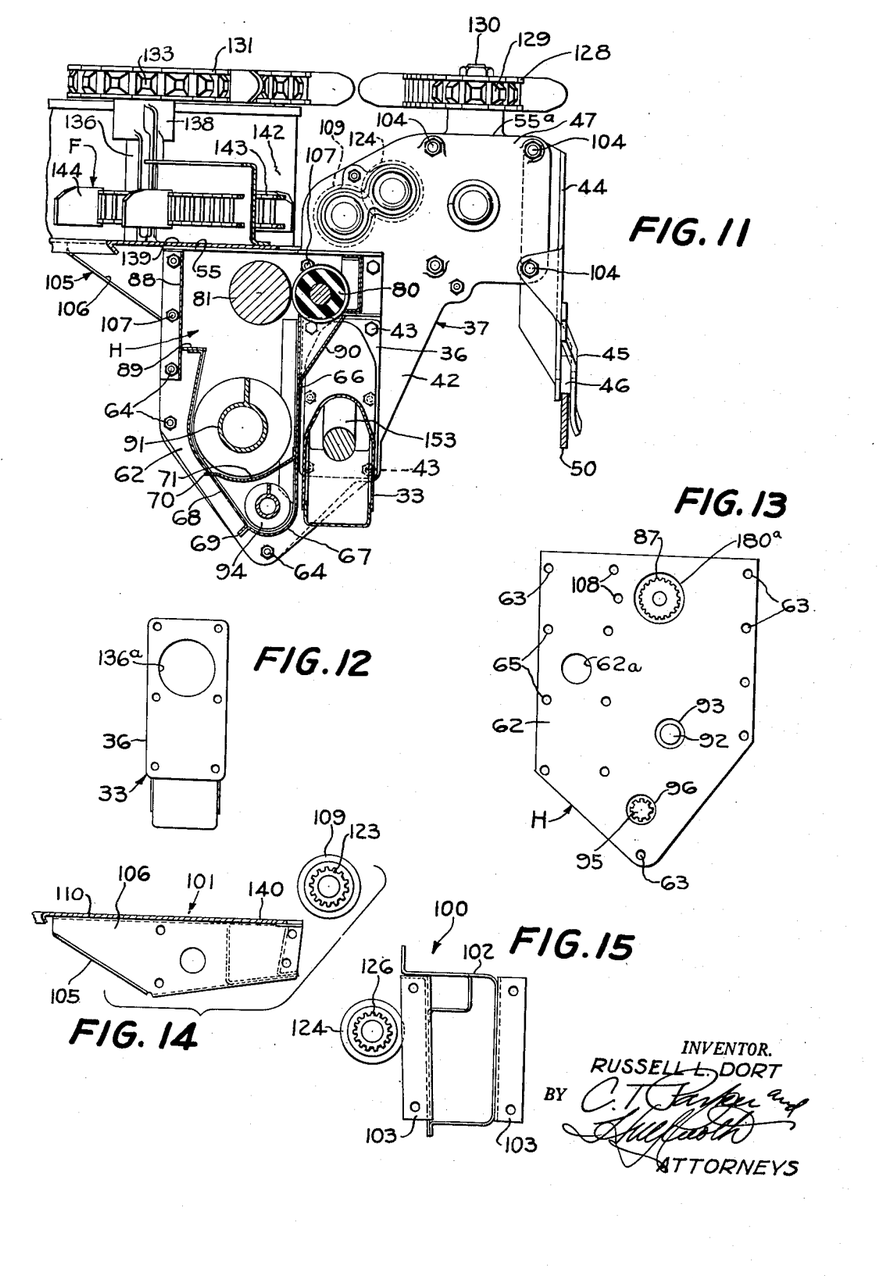
Figure 11 is an enlarged transverse sectional view taken substantially along the line 11—11 of Figure 2.
Figure 12 is an enlarged end view of the support or torque arm, as viewed along the line 12—12 of Figure 10.
Figure 13 is an enlarged end view of the husking unit, as viewed along the line 13—13 of Figure 4.
Figure 14 is an enlarged end view of the outer snapping roll and support, as viewed along the line 14—14 of Figure 4.
Figure 15 is an enlarged end view of the inner snapping roll and support, as viewed along the line 15—15 of Figure 4.

The casing 37 is provided with a rear wall 42 which provides a transverse, generally upright mounting face of substantially greater area than the mounting portion provided by the flange 36 on the torque arm 33. The flange 36 is rigidly secured to this rear wall 42 by any suitable means, such as a plurality of bolts 43 (Figure 11).

As previously stated, the torque arm 33 is of relatively rigid tubular construction and the face provided by the flange 36 is of substantial area. Likewise, the transverse pivot pin 35 and transverse extent of the bracket 34 are substantial. The torque arm 33 thus becomes a relatively rigid thrust and torque member for mounting the casing 37 on the tractor. Any thrust imparted to the casing 37 is, of course, taken by the arm 33 and transmitted to the tractor rear axle housing 22. Similarly, any twisting strains developed in the row unit are taken by the torque arm 33.

In order that the supporting structure comprising the arm 33 and casing 37 may be stabilized or guided vertically, stabilizing or guide means is provided. This means is best illustrated in Figures 2 and 11 and preferably comprises a bracket 44 having a bifurcated lower portion 45 which carries a roller 46. The bracket 44 is secured to the inside of an offset mounting portion 47 on the casing 37 (Figure 11). It will be noted that the portion 47 is offset laterally and vertically with respect to the major portion of the casing. The purpose of this arrangement will be brought out in greater detail below.

The stabilizing means further includes a bracket or bearing 48 carried by the tractor body 20 (Figure 2). This bearing or bracket journals a transversely extending rockshaft 49 to the outer end of which is fixed a downwardly and forwardly extending lever arm 50 (Figures 1 and 11). This arm engages the roller 46 from below and is further received between the parts of the bifurcated portion 45.

The rockshaft 49 extends, of course, across the tractor body 20 and is provided intermediate its ends with at least one downwardly extending, rigidly attached lever arm 51. Counterbalancing means in the form of a relatively strong tension spring 52 is connected at one end to the arm 51 and is anchored at 53 at its other end to a portion of the tractor body 20.

It will thus be seen that the main support comprising the parts 33 and 37, although pivoted on the tractor at 35 for vertical movement relative to the tractor, is stabilized by the means 44, 50 and is counterbalanced by the means comprising the spring 52. It will be appreciated, of course, that the supporting structure carries considerable weight in the form of the snapping and gathering mechanism S and husking unit H, the details of which will be described subsequently.

For the purposes of facilitating the further description of the casing 37 in connection with the manner in which it supports the harvesting components, further reference will be made to the particular structure of the casing. As previously stated, the casing includes the rear wall 42 which provides a rear mounting face. Similarly, the casing includes a transverse, generally upright forward wall 54. The casing further includes an upper transverse wall 55 which provides a generally flat, rearwardly and upwardly inclining surface (that is, when the casing 37 is disposed as shown in Figures 1 and 3 for example). The surface of this wall 55 is substantially below the level of an upper wall 55a comprising part of the offset casing portion 47 (Figure 11). Likewise, the top wall 55 is laterally outwardly offset with respect to the casing portion 47. It will be noted in Figure 11 that the connection of the torque arm 33 at 36, 43 to the rear wall 42 of the casing 37 is below the level of the upper or top wall 55.

*Power adjustment of the mounting structure (reference numerals 56–61)*

Inasmuch as the mounting structure is pivotally carried on the tractor by means of the bracket 34 and pivot pin 35, it may be adjusted vertically, and for this purpose appropriate connections are made with the power lift arm 31. A longitudinally extending lifting link 56 has an integral rear portion 57 curved below the left-hand rear axle housing 22 and pivotally connected at 58 to the arm 31. The link 56 extends forwardly to a pivotal connection 59 with an arm 60 fixed to and extending upwardly from the outer end of the rockshaft 49.

It will thus be seen that rocking of the rockshaft 30 in a counterclockwise direction, as viewed in Figure 1, will result in rearward swinging of the lift arm 31. This in turn will move the lifting link 56 rearwardly and will rock the rockshaft 49 in a clockwise direction, following which the arm 50 will engage the roller 46 and will pivot the mounting structure upwardly about the transverse pivot 35. The energy stored in the spring 52 acts in the same direction and thus the spring will assist lifting the row unit. Since the connection between the roller 46 and the arm 50 is not positive—that is, the roller is not confined to movement with the arm 50—, the row unit may float upwardly. However, because of the action of the spring 52, the arm 50 will tend to follow the roller upwardly during floating movement of the row unit. For this purpose, the forward end of the lifting link 56 is slotted at 61 so that the spring will serve to counterbalance the row unit without exerting force through the link 56 against the lift arm 31.

*Husking unit (reference numerals 62–99)*

The husking unit, hereinbefore designated generally by the letter H, comprises an elongated unit preferably made up of sheet metal sections and is generally U-shaped in cross section, as best seen in Figure 11. This unit has a front wall 62 (Figure 13) which provides a mounting portion for carrying the unit on the casing 37. The wall 62 is provided with a plurality of bolt openings 63 which are alined with certain of the bolt openings 40 and 41 in the casing 37. The husking unit wall 62 is thus secured to the rear wall 42 of the casing 37 by a plurality of bolts 64 (Figure 11). The plate or wall 62 overlaps that portion of the casing wall 42 to which the front flange 36 of the torque arm 33 is secured, and the bolts 43 which secure the flange 36 to the casing 37 pass through bolt holes 65 in the wall 62 (Figure 13), and the husking unit extends rearwardly as a cantilever.

The sheet metal structure of the husking unit provides an inner longitudinal, substantially upright wall or sheet 66 which is curved outwardly and upwardly along its lower marginal edge to provide a trough 67. The outer wall of the husking unit is designated at 68 and comprises a longitudinally extending removable section which extends downwardly to adjoin the trough 67, as at 69. A longitudinal partition 70, which is preferably arcuate in cross section, extends lengthwise of the husking unit and is spaced slightly above the trough 67 to provide a second trough 71.

Figures 4, 5, 6:
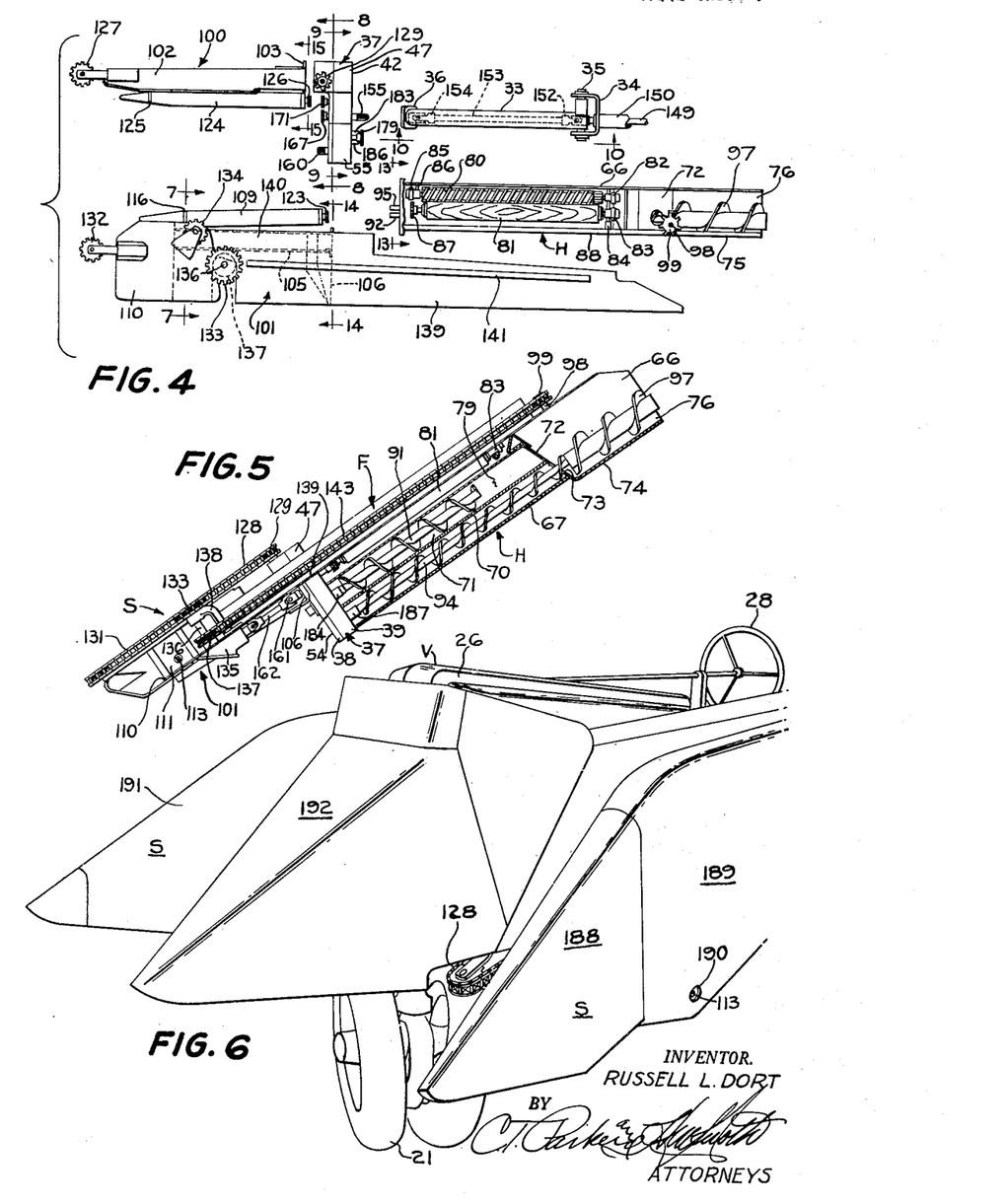
Figure 4 is an exploded view showing the relationship of the various parts prior to assembly or following disassembly thereof.
Figure 5 is a longitudinal sectional view taken substantially along the line 5—5 of Figure 2.
Figure 6 is a perspective view of the forward and left-hand portion of the tractor-mounted picker, showing the picker unit in elevated position and illustrating the manner in which the front wheels of the tractor may be steered.

As best shown in Figure 5, the trough 67 and partition 70 terminate somewhat short of the rear end of the husking unit, and a forwardly inclined transverse wall 72 extends transversely outwardly from the inner wall 66. The wall 72 is apertured at 73 in alinement with the trough 67. A downwardly offset, rearwardly extending bottom wall 74 continues rearwardly from the rear end of the trough 67 as terminated by the wall 72. The rear trough is defined at its inside by the inner husking unit wall 66 and at its outer side by a secondary substantially vertical wall 75 (Figure 1). The troughs thus defined by the wall portions 66, 74 and 75 open at a rear or discharge end 76 of the husking unit and provide for the discharge of crops to the wagon elevator W.

The outer removable section or wall 68 of the husking unit terminate short of the transverse wall 72, as at 77 (Figure 1). However, a continuation outer wall 78 is provided for the trough 67, thus enclosing the trough 67 between the end 77 of the wall 68 and the wall 72. Thus the upper trough 71 opens to a discharge space 79 ahead of the wall 72, whereas the trough 67 continues and communicates through the aperture 73 in the wall 72 to the rear trough provided by the wall portions 66, 74 and 75.

The upper portion of the husking unit is provided with a pair of crop-engaging devices such as longitudinally extending husking rolls 80 and 81. The inner roll 80 is preferably of rubber, while the outer roll 81 is preferably of wood. These rolls extend longitudinally of the husking unit below the level of the upper transverse wall 55 of the casing 37 and substantially above the level of the upper trough 71. The rear ends of the husking rolls are carried respectively in bearings 82 and 83 mounted in a transverse bracket 84 just ahead of the transverse separating wall 72. The forward end of the inner roll 80 is journaled in a bearing 85 supported in a bracket 86 adjacent the forward end of the husking unit. The forward end of the outer roll 81 is not supported in the husking unit but is otherwise carried, as will be brought out below. The forward end of the roll 81 has a toothed coupling element in the form of a sprocket 87 which cooperates with a driving connection to be described subsequently. The roll 80 is not positively driven and is rotated only by the roll 81 and crop material between the rolls.

As previously stated, the husking rolls 80 and 81 are substantially above the level of the upper trough 71. The upper portion of the husking unit has at its outer side a longitudinally extending wall 88 which is joined at its forward end to the front wall or plate 62 and which extends lengthwise of the husking unit and completely toward the rear end thereof. This wall 88 has a lower flange 89 which is associated with an upper flanged portion of the removable section 68 (Figure 11). Although the transverse dimension of the trough 71 is considerably narrower than the upper portion of the husking unit, the trough 71 does function to receive husks from corn which passes over the husking rolls. Since the husking rolls are slightly laterally offset with respect to the trough 71, the inner wall 66 is inclined inwardly at 90 (Figure 11) to accommodate the inner roll 80 and to insure that husks removed from corn by the husking rolls will pass downwardly to the trough 71.

There is mounted in the trough 71 crop-moving means which is here illustrated as comprising a longitudinally extending husk auger 91. The forward end of this auger has a coaxial shaft portion 92 which projects forwardly through an aperture 93 in the front wall or plate 62. The auger 91 is otherwise unsupported, being carried solely by the portions forming the trough 71. The auger is driven through a connection to the shaft 92 by means to be described below. The rear end of the auger terminates short of and discharges into the space 79. Hence, husks removed by the husking rolls 80 and 81 are discharged downwardly by the rolls to the husk auger 91 and the latter moves the husks outwardly through the discharge space 79. Since this space is separated from the trough 67 by the rearward extension of the partition 70, the husks are discharged laterally, as will be apparent from an examination of Figure 1.

The partition 70 is perforated so that shelled corn, reaching the husk trough 71 along with husks, may pass downwardly into the lower trough 67. This trough is thus a shelled-corn trough, and, for the purpose of moving the shelled corn rearwardly, this trough carries a longitudinally extending device in the form of an auger 94. The auger 94 is considerably smaller than the husk auger 91, but is substantially longer than the husk auger. The forward portion of the shelled-corn auger has a drive element in the form of a forwardly extending shaft portion 95 which projects forwardly through an opening 96 in the front wall or plate 62, at which point a drive connection is established, as will presently appear.

The shelled-corn auger extends rearwardly and is confined to the trough 67 as provided by the wall portions 66, 68, 70 and 78 and projects rearwardly through the aperture 73 in the transverse wall 72. At this point, the auger is joined to a coaxial and larger discharge auger 97. This auger operates in the trough provided at the rear of the husking unit and serves to discharge to the wagon elevator W both ears from the husking rolls and shelled corn from the shelled-corn auger and trough. It will thus be seen that the husks and other trash discharged by the husk auger 91 through the space 79 do not reach the wagon elevator W. It will be understood that the ears, with the husks removed, are moved rearwardly over the husking rolls 80 and 81 by the first elevator F and these ears fall downwardly over the inclined transverse wall 72 to be received by the discharge auger 97. The features pertaining to husking, husk-discharge and shelled-corn-discharge form the subject matter of assignee's copending application, Serial No. 275,535, filed March 8, 1952 as a continuation of abandoned application, Serial No. 95,508, filed May 26, 1949.

From the description of the husking unit thus far, it will be individually seen that this unit is complete and carries all the husking components, including the husking rolls 80 and 81, the augers 91, 94 and 97, and all the necessary structural parts; so that the husking unit may be removed from or assembled to the casing 37. In addition, the rear portion of the husking unit carries an upstanding shaft 98 on which is mounted a sprocket 99. This sprocket carries one end of the first elevator F, the details of which will be described below.

Snapping unit
(reference numerals 100–138)

The snapping unit S comprises an inner sub-assembly 100 and an outer sub-assembly 101.

The inner sub-assembly includes a longitudinally extending supporting member or frame element 102 which may be of any suitable construction. As shown in Figure 15, it is a fabricated element of tubular design having at its rear end a pair of flanges 103. These flanges are transversely spaced apart and substantially upright as respects the longitudinal extent of the row unit and provide a substantial area or mounting face for mounting of the sub-assembly 100 as a cantilever on the front face or wall 54 of the casing 37. The means for securing the sub-assembly 100 to the casing 37 includes, in addition to the flanges 103, a plurality of bolts 104 which pass through the casing 37. The inner pair of these bolts serves also to mount the stabilizer bracket 44 on the casing (Figure 11). The sub-assembly 100 is thus rigidly and removably carried by the casing 37 and extends longitudinally forwardly therefrom to provide one of the components of the gathering and snapping unit.

The outer sub-assembly 101 includes a longitudinal frame or supporting member 105 which is, like the member 102, preferably of tubular construction. The member 105 has a rear flange or face 106 which provides a mounting portion for securing of the outer sub-assembly as a cantilever to the front wall 54 of the casing 37. The means for accomplishing the securing of the sub-assembly 101 to the casing 37 includes a plurality of bolts 107 which pass rearwardly through the casing 37 and also through certain of the openings 63 in the plate 62. The inner pair of bolts 107 pass through openings 108 in the plate 62 (Figure 13). The rigid and removable mounting of the sub-assembly 101 disposes the frame member 105 in longitudinal parallelism with the frame member 102 of the sub-assembly 100.

As part of the sub-assembly 101, there is provided a longitudinally extending snapping roll 109, the forward end of which is journaled on the sub-assembly frame member 105 by the means shown in Figure 7. The member 105 has an upper horizontal plate portion 110 which is provided adjacent its inner longitudinal edge with a pair of upstanding brackets 111. These brackets carry rigidly a transversely extending sleeve 112 within which is carried a snapping roll supporting member 113. The inner end of the member 113 is provided with an intersecting vertical portion 114 which receives a vertical pin 115 for mounting a yoke or bearing 116 which in turn carries the snapping roll 109.

That end of the member 113 adjacent the snapping roll 109 is enlarged at 117 to provide a guide which slidably carries the member axially of the sleeve 112. The outer end of the sleeve 112 has rigidly secured thereto an apertured cap 118 which is internally threaded to receive a sleeve extension 119. The outer end of the member 113, being in the form of a rod, is slidably received in the sleeve 119 and has its extreme outer end threaded at 120 to receive an adjusting nut 121. A compression spring 122 functions between the enlarged portion 117 and the shoulder provided by the inner end of the sleeve extension 119 and operates to hold the snapping roll 109 inwardly to the limited extent defined by the adjustment of the nut 121. The entire assembly may yield outwardly relative to the sleeve 112 and the sleeve extension 119.

The opposite end of the snapping roll 109 is provided with a coupling element in the form of a sprocket 123 (Figures 4 and 14), by means of which the snapping roll is driven by an output element to be subsequently described. The snapping roll 109 is supported solely by the bearing assembly 111–116 at its forward end and by the drive connection or coupling at its rear end. The forward bearing assembly provides a flexible or articulate connection for the snapping roll which facilitates assembly and adjustment of the roll, all of which will appear below.

The inner sub-assembly 100 includes a snapping roll 124 which is carried at its forward end by a bearing assembly 125, the details of which are not important here. The rear end of the snapping roll 124 is provided with a coupling element in the form of a sprocket 126 (Figures 4 and 15) which, like the sprocket 123 on the snapping roll 109, forms part of a coupling for the drive connection of the snapping roll, the details of which will be described below in connection with the description of the driving mechanism.

The inner snapping sub-assembly 100 carries at its forward end a sprocket 127 which forms part of crop-handling or crop-engaging means, here in the form of an endless gathering chain 128 (Figure 2). This chain extends lengthwise of the sub-assembly and above and alongside the inner snapping roll 124, generally in the conventional manner. The rear portion of the chain is looped about a sprocket 129 which is mounted on a shaft 130 projecting upwardly from the offset casing portion 47 of the casing 37 (Figures 2, 4, 5, 8 and 11), the details of which will be further described in connection with the driving mechanism.

The outer sub-assembly 101 includes an outer gathering chain 131 (Figure 2) which is looped about a pair of longitudinally spaced sprockets 132 and 133 and also about an idler sprocket 134. The frame member 105 carries intermediate its front and rear ends a gear box 135 (Figure 5) within which is suitable gearing for driving an upstanding shaft 136 (Figures 4 and 5) to the upper end of which the gathering chain sprocket 133 is keyed. The gear case 135 is below the upper plate 110 of the sub-assembly 101 and the shaft 136 carries intermediate its ends, and above the plate 110, a smaller driving sprocket 137 (Figures 4 and 5). A casting 138 (Figure 5) provides adequate support for the shaft 136 above the plate 110.

First elevator
(reference numerals 101, 110, 137, 139–144)

The outer sub-assembly 101 includes a longitudinally rearwardly extending member in the form of a plate or section 139 which extends rearwardly substantially as a continuation of the plate 110. This plate or section 139 includes a portion 140 (Figures 2 and 14) which lies closely adjacent and outside the outer snapping roll 109 and is disposed at such level that, when assembled, it extends across the top wall 55 of the casing 37, thus establishing communication between the snapping unit and the husking unit. The rearward extent of the plate 139 is substantially coextensive with the husking unit and has extending lengthwise thereof an upstanding sheet metal web 141. This web is so disposed that it lies generally in a vertical plane including the axes of the shafts 98 and 136. The section 139 and the upstanding web 141 thus provide alongside and slightly below the level of the snapping rolls 109 and 124 a trough 142 rearwardly along which snapped ears may be moved by ear-moving means comprising an endless elevator chain 143. This chain has thereon a plurality of outwardly projecting paddles or flights 144, and the inner run of the chain moves rearwardly, as indicated by the arrow A in Figure 2, to move snapped ears rearwardly to and over the husking rolls 80 and 81. The snapped ears from the snapping unit are discharged across the top wall 55 of the casing 37 by the communicating portions previously described. The flights 144 are so disposed as to function additionally as means for moving ears rearwardly over the husking rolls 80 and 81 and further serve as means for discharging the husked ears at the rear end of the rolls to the discharge trough 76 and discharge auger 97.

The first elevator chain 143 is driven by the sprocket 137 on the upstanding shaft 136 and is carried by the idler sprocket 99 previously described as being carried at a rear portion of the husking unit H.

For all practical purposes, the first elevator may be considered structurally a component part of the gathering and snapping unit, particularly a part of the outer sub-assembly 101. However, the particular separation of the parts pertains merely to the preferred manner in which they are assembled and does not indicate that there is any separation in the function thereof. For example, the snapping rolls are functionally tied together with the first elevator by means of the cooperation thereof in delivering snapped ears to the first elevator trough. The first elevator is in turn functionally tied in with the husking unit inasmuch as it serves to provide for the delivery of snapped ears to the husking rolls and in addition moves the ears along the husking rolls and to the discharge ends thereof. The ease with which the combined outer sub-assembly 101 and elevator structure may be first assembled and then assembled to the remainder of the structure will be apparent from an examination of Figure 4.

Driving mechanism
*(reference numerals 32, 130, 144–187)*

The main drive for the picker components is taken from the power take-off shaft 32 of the tractor. This shaft carries a sprocket 145 (Figure 1) about which is trained a driving chain 146. This chain is in turn trained about a sprocket 147 which forms part of a slip clutch assembly 148 carried on a longitudinally extending shaft 149 journaled in a sleeve 150. The sleeve extends longitudinally of the tractor and over the rear axle structure 22 and preferably forms a part of the mounting bracket 34 and an additional supporting bracket 151. The bracket 151, like the bracket 34, is rigidly carried by the rear axle housing 22.

The shaft 149 extends forwardly into the rear portion of the torque arm 33 (Figure 4) and is provided with a universal joint connection 152 to a driving element in the form of a shaft 153 enclosed within the hollow torque arm 33. The forward end of the shaft 153 extends through an appropriate opening 136ª in the flange 36 (Figure 12) and has a universal joint connection 154 with a rearwardly extending splined input element or shaft 155 which is journaled in the gear casing 37 (see also Figure 9). The plate 62 (Figure 13) has formed therein an opening 62ª which is alined with the opening 136ª when the parts are assembled and through which the shaft 153 extends to reach the shaft 155.

As best shown in Figures 8 and 9, the casing 37 carries a plurality of shafts and gears which provide the driving mechanism for the supplying of power to the various components of the harvester. The input shaft 155 has keyed thereto a pinion 156 which is in constant mesh with a larger gear 157 carried on an idler shaft 158. The idler gear 157 is in constant mesh with a pinion 159 that is keyed to an output element or shaft 160. This shaft projects forwardly through the front wall 54 of the casing 37 and is splined for connection by means of a universal joint 161 to a longitudinally extending power shaft 162, the forward end of which is connected to suitable gearing (not shown) contained within the gear box 135 (Figure 5).

It will be seen from the description thus far that the power delivered by the power take-off of the tractor is transmitted through the shaft 153 to the shaft 155 in the main casing 37 and thence through the pinions and gears 156, 157 and 159 to the shaft 160, and thence through the shafting 161—162 to the shaft 136 and sprockets 133 and 137. Hence, the outer gathering chain 131 and first elevator chain 143 are driven.

The input shaft 155, by means of the pinion 156, drives a gear 163, which is an idler carried on a shaft 164 in the casing 37. This gear 163 is in constant mesh with a pinion 165 which is keyed to a shaft 166. This shaft serves as the output element for driving the outer snapping roll and projects forwardly outside the casing 37 and is provided with a coupling element in the form of a sprocket 167 which is complementary to the sprocket coupling member 123 at the rear end of the outer snapping roll 109. When the components are assembled, the sprockets 123 and 167 are alined and are interconnected by a coupling element in the form of a short endless chain or the equivalent, as indicated generally by the numeral 168 in Figure 2.

The pinion 165 on the output shaft 166 is in constant mesh with a similar pinion 169 on an adjacent output shaft 170. This shaft, like the shaft 166, projects forwardly through the front wall 54 of the casing 37 and is provided with a coupling element in the form of a sprocket 171. When the components are assembled, this sprocket 171 is coaxial with and complementary to the coupling sprocket 126 at the rear end of the inner snapping roll 124. The two coupling sprockets are interconnected by means of a flexible chain or its equivalent, as indicated at 172 in Figure 2. The details of the coupling are specifically unimportant and are separately covered in assignee's co-pending application, Serial No. 136,627, filed January 3, 1950, now Patent No. 2,540,315.

The pinion 169 is in constant mesh with a gear 173 which is keyed to a shaft 174. This shaft has keyed thereto a bevel pinion 175 which, when the casing halves are assembled, meshes with a bevel pinion 176 keyed to the vertical shaft 130, previously described (Figure 8). Thus, power is transmitted from the main or input shaft 155 through the gears and pinions 163, 165, 169, 173, 175, and 176 to the shaft 130. From this shaft, power is taken to drive the inner gathering chain 128.

The pinion 159, that is keyed to the output shaft 160 for the first elevator and outer gathering chain, is in constant mesh with a similar pinion 177 keyed to a shaft 178. This shaft projects through the rear wall 42 of the casing 37 and has keyed thereto a second element in the form of a sprocket 179 (Figure 4). This sprocket, when the husking unit is assembled to the casing 37, is coaxially alined with the coupling sprocket 87 on the forward end of the wooden husking roll 81 and the two sprockets are interconnected by a coupling chain or its equivalent as indicated at 180 in Figure 2. The front wall or plate 62 of the husking unit is provided with an aperture 180a (Figure 13) through which the coupling sprocket 179 on the shaft 178 extends.

The idler shaft 158 carries thereon for rotation with the idler gear 157 a pinion 181 which is in constant mesh with a gear 182 keyed to an output shaft 183. This shaft projects outwardly through the rear wall 42 of the casing 37 and, when the husking unit is assembled to the casing 37, is coaxially alined with the forwardly projecting shaft 92 of the husk auger 91. The shafts 92 and 183 are interconnected by a coupling 184 (Figure 5).

The gear 182 is in constant mesh with a pinion 185 keyed to an output shaft 186. This shaft extends rearwardly and, when the husking unit is assembled to the casing 37, is coaxially alined with the shaft 95 at the forward end of the shelled-corn auger 94. The two shafts 95 and 186 are interconnected by a coupling 187 (Figure 5). The shafts 183 and 186 extend rearwardly through the rear wall 42 of the casing 37 and also extend rearwardly through the front wall or plate 62 of the husking unit, the shafts extending respectively through the openings 93 and 96 (Figure 13) provided in this plate.

Miscellaneous

The description of the foregoing structural and functional components of the picker has proceeded in connection with a single row unit at the left side of the vehicle. As indicated in Figure 6, there may be a symmetrical row unit at the right side of the vehicle so that a two-row machine is provided. Whether or not the machine is a single row or a multiple row machine is immaterial for the present purposes.

In the tractor-mounted picker illustrated, the row units are provided with appropriate shielding or styling.

The shielding structure for the left-hand row unit comprises forward and rearward parts 188 and 189. The forward part 188 is in the form of a gathering shield and may be of any conventional shape or construction. The rear part extends longitudinally over the rear portion of the gathering and snapping unit and substantially encloses the upper portion of the husking unit. The outer side wall of the shielding or styling 189 includes at a lower forward portion thereof an opening 190 through which access may be had to the adjusting nut 121 for the outer snapping roll 109.

The right-hand shielding structure is similarly constructed and is symmetrical rather than identical. The gathering point for the right-hand unit is visible at 191 in Figure 6. A center shield 192 is provided for enclosing the forward portion of the tractor and is disposed ahead of the steerable front truck 21 of the tractor. This center shield may be appropriately carried by and between the two row units. The arrangement is such that the center shield 190 is lifted when the row units are lifted by the power lift means. The range of movement of the power lift means is such as to elevate both row units and the center shielding structure 192 to such height that the steerable front truck 21 may be turned in either direction through its maximum range, as will be evident from an examination of Figures 3 and 6.

The wagon elevator forms no part of the present invention and therefore will not be disclosed beyond what is illustrated.

Summary

The fundamental principle involved in the invention illustrated and described is the provision of the main supporting structure which serves the dual function of mounting the row unit on the tractor or similar vehicle and the mounting of the various components of the row unit so that the entire assembly is substantially an integral unit. Further, the main casing 37, in addition to providing the supporting or mounting portion for the various components of the picker, completely encloses the main driving element, thus facilitating the lubrication of the drive and insuring long life thereof by excluding dirt and dust. Further, enclosure of the major portion of the drive eliminates hazards to the harvester operator.

The structural relationship of the two main components 33 and 37 is such as to accomplish the elimination of expensive and complicated angle bar constructions that have characterized pickers in the past. The flexible connection of the snapping rolls 109 and 124 respectively to the snapping roll output shafts 166 and 170 facilitates assembly and adjustment of the snapping rolls, since perfect axial alinement is impossible because of spreading of the rolls in operation and because of adjustment at the lower ends of the rolls.

Various other features and important objects of the invention not specifically enumerated above will undoubtedly occur to those versed in the art, as will several modifications and alterations in the preferred form of the invention illustrated, all of which may be achieved without departing from the spirit and scope of the invention as defined in the appended claims.

What is claimed is:

1. An implement attachment, for a vehicle of the type having a longitudinal body provided with laterally outwardly projecting carrying structure and including a power take-off element, comprising: an elongated hollow support having front and rear ends and positionable alongside the body with its rear end adjacent the carrying structure; means at said rear end for connecting the support on a transverse pivot axis to the carrying structure; a drive-mechanism housing having front and rear mounting faces; means for rigidly securing the support and housing together via the front end of the former and the rear face of the latter; crop-gathering means having a rear mounting portion; means for rigidly sustaining the gathering means on the housing via said rear mounting portion of the former and the front face of the latter; crop-handling means positionable to extend lengthwise and rearwardly as respects the support, and including a mounting portion; means for rigidly sustaining the crop-handling means on the housing via said mounting portion of the former and one of the faces of the latter; drive mechanism in the housing, including a plurality of shafts projecting exteriorly of the housing; means for connecting one of the shafts to the gathering means; means for connecting another of the shafts to the crop-handling means; a drive shaft within the hollow support; means for connecting one end of said drive shaft to another of said housing shafts;

and means for connecting the other end of the drive shaft to the vehicle power take-off element.

2. The invention defined in claim 1, further characterized in that: the housing shaft for the gathering means projects through the front face of the housing; the mounting for the gathering means to the housing is separable in the plane of said front face; and the connection between said housing shaft and the gathering means is separable generally in the plane of said front face.

3. An implement attachment, for a vehicle of the type having a longitudinal body provided with laterally outwardly projecting carrying structure, comprising: an elongated support having front and rear ends and positionable alongside the body with its rear end adjacent the carrying structure; means at said rear end for connecting the support to the carrying structure; a mounting element having front and rear mounting faces of substantially greater transverse dimension than the front end of the support; means for rigidly sustaining the support on the mounting element via the front end of the former and a portion of the rear face of the latter; crop-gathering means having a rear mounting portion; means for rigidly sustaining the gathering means on the mounting element via said rear mounting portion of the former and a portion of the front face of the latter; crop-handling means positionable to extend lengthwise and rearwardly as respects the support, and including a mounting portion; and means for rigidly sustaining the crop-handling means on the mounting element via said mounting portion of the former and another portion of one of the faces of the latter.

4. A row-crop attachment, for a vehicle of the type having a longitudinal body provided with laterally outwardly projecting carrying structure, comprising: an elongated support having front and rear ends and positionable lengthwise of the body with its rear end adjacent the carrying structure; means for connecting said rear end to the carrying structure; a mounting element having a plurality of mounting faces, and positionable at the front end of the support with certain of said faces disposed transversely as respects the support; means for rigidly and removably sustaining the mounting element on the front end of the support via one face of the mounting element; crop-gathering means positionable ahead of the mounting element generally in longitudinal alinement with the support, and including a pair of laterally spaced members having rear end portions laterally alined and proximate to a transverse face of the mounting element; and means rigidly and removably sustaining said rear end portions of said members on a transverse face of the element.

5. The invention defined in claim 4, further characterized in that: each of the gathering means members has an elongated rotatable part journaled at one end on the respective member and having its other end proximate to the mounting element; and means is provided for removably journaling said other end of each rotatable part on the mounting element.

6. The invention defined in claim 4, further characterized in that: one of the gathering means members has an elongated rotatable part journaled at one end on said member and having its other end proximate to the mounting element; said mounting element has a rotating shaft projecting toward said other end of the rotatable part; and separable means is provided for drivingly interconnecting said rotatable part and said shaft.

7. An implement attachment, for a vehicle of the type having a longitudinal body provided with laterally outwardly projecting carrying structure, comprising: an elongated support having front and rear ends and positionable lengthwise of the body with one of its ends adjacent the carrying structure; means for connecting said one end to the carrying structure; a mounting element having a plurality of mounting faces, and positionable at the other end of the support with certain of said faces disposed transversely as respects the support; means for rigidly and removably sustaining the mounting element on said other end of the support via one face of the mounting element; implement means positionable to extend from the mounting element generally in longitudinal alinement with the support, and including a member having an end portion proximate to a transverse face of the mounting element; and means rigidly and removably sustaining said end portion of said member on a transverse face of the element.

8. In a row-crop implement attachment for a vehicle having a longitudinal body or frame and including a power take-off shaft, mounting structure comprising: an elongated hollow support having front and rear ends, the front end being flanged transverse to the length of the support to provide a mounting surface and the rear end having means for connecting said support to the vehicle; a drive-mechanism housing disposed at the front end of the support and having front and rear mounting faces transverse to the length of the support; drive mechanism enclosed by the housing and including a power delivery shaft and a power input shaft projecting respectively forwardly and rearwardly through the front and rear mounting faces; means on the front face of the drive mechanism housing for mounting an implement in lengthwise alinement with the power delivery shaft; means for securing the flanged front end of the support to the rear face of the housing with the support substantially in lengthwise alinement with the power input shaft; and a power transmission shaft within the support and having a forward end connectible to said input shaft and a rear end connectible to the power take-off shaft.

9. In a row-crop implement attachment for a vehicle having a longitudinal body or frame and including a power take-off shaft, mounting structure comprising: an elongated support having front and rear ends, the front end being flanged transverse to the length of the support to provide a mounting surface and the rear end having means for connecting said support to the vehicle; a drive-mechanism housing disposed at the front end of the support and having front and rear mounting faces transverse to the length of the support for mounting implement parts both ahead of and behind the drive-mechanism housing; drive mechanism enclosed by the housing and including a pair of implement-driving shafts projecting respectively forwardly and rearwardly through the front and rear mounting faces; and means for securing the flanged front end of the support to the rear face of the housing with the support laterally offset from the rear shaft.

10. A row-crop harvester attachment, for a vehicle of the type having a longitudinal body provided with laterally outwardly projecting carrying structure, comprising: a main hollow torque arm having front and rear ends, and positionable lengthwise of the vehicle body with its rear end adjacent to and having means for connection to the vehicle carrying structure; a combined supporting and drive-means-carrying unit having front and rear mounting faces disposed transverse to the length of the torque arm and being of substantial area; means for securing the front end of the torque arm to a portion of the rear mounting face of the unit; crop-treating means including an elongated housing positionable lengthwise to extend rearwardly from the unit and having a front end receivable by a portion of the rear mounting face of the unit, and further including at least one crop-treating roll having a forward end proximate to said rear mounting face; means for sustaining the front end of the crop-treating means on the rear mounting face of said unit; crop-gathering means positionable ahead of the unit and having a rear end to be received by the front mounting face of said unit, and further including a pair of longitudinal crop-removing rolls having rear ends adjacent said front mounting face; means for rigidly sustaining the gathering means at its rear end on the front mounting face of the unit; drive means within the unit and including a pair of shafts projecting forwardly through said front mounting face respectively in alinement with the crop-removing rolls, and a pair of shafts projecting rearwardly through said rear mounting face and respectively in alinement with the crop-treating roll and the hollow torque arm; a shaft within the torque arm; and a plurality of individual means for connecting the forwardly projecting shafts respectively to the crop-removing rolls and the rearwardly projecting shafts respectively to the crop-treating roll and to the torque arm shaft.

11. A row-crop harvester attachment, for a vehicle of the type having a longitudinal body provided with laterally outwardly projecting carrying structure, comprising: a main torque arm having front and rear ends, and positionable lengthwise of the vehicle body with its rear end adjacent to and having means for connection to the vehicle carrying structure; a combined supporting and drive-means-carrying unit having front and rear mounting faces disposed transverse to the length of the torque arm and being of substantial area; means for securing the front end of the torque arm to a portion of the rear mounting face of the unit; crop-treating means including an elongated housing positionable lengthwise to extend rearwardly from the unit and having a front end receivable by a portion of the rear mounting face of the unit, and further including at least one crop-treating roll having a forward end proximate to said rear mounting face; means for sustaining the front end of the crop-treating means on the rear mounting face of said unit; crop-gathering means positionable ahead of the unit and including longitudinal support members having rear ends transversely spaced apart and alined to be received by the front mounting face of said unit, and further including a pair of longitudinal crop-removing rolls having rear ends adjacent said front mounting face; means for sustaining said members individually at their rear ends on said front mounting face; drive means within the unit and including a pair of shafts projecting forwardly through said front mounting face respectively in alinement with the crop-removing rolls, and a shaft projecting rearwardly through said rear mounting face and in alinement with the crop-treating roll; and a plurality of individual means for connecting the forwardly projecting shafts respectively to the crop-removing rolls and the rearwardly projecting shaft to the crop-treating roll.

12. An implement attachment, for a vehicle having a longitudinal body provided with laterally extending carrying structure, comprising: mounting means generally in the form of a box-like unit positionable alongside the body in longitudinally spaced relation to the carrying structure, and having a plurality of mounting portions, one of which is proximate to the body, a second of which serves for the mounting of an implement thereon, and a third of which faces toward the carrying structure; an elongated thrust and torque member rigidly connected to said third mounting portion and extending toward and having an end proximate to the carrying structure, said end including means for connection to said structure to provide for vertical movement of the unit and member; and stabilizing means secured to the second mounting portion of the unit for association with the vehicle body to stabilize the member and unit against lateral displacement relative to the vehicle.

13. An implement attachment, for a vehicle having a longitudinal body provided with laterally extending carrying structure, comprising: mounting means generally in the form of a box-like unit positionable alongside the body in longitudinally spaced relation to the carrying structure, and having a plurality of mounting portions, one of which is proximate to the body, a second of which serves for the mounting of an implement thereon, and a third of which faces toward the carrying structure; an elongated thrust member connected to said third mounting portion and extending toward and having an end proximate to the carrying structure, said end including means for connection to said structure to provide for vertical movement of the unit and member; and means secured to the second mounting portion of the unit for association with the vehicle body to guide the member and unit during vertical movement.

14. A row-crop harvester attachment, for a vehicle having a longitudinal body, comprising: a support positionable adjacent the body and having means thereon for the mounting thereof on the body, and further having a carrying portion for the carrying of row-crop harvester structure; said carrying portion including a casing on the support and provided with a first wall having a generally flat, external mounting face and with a second wall at an angle to said face; driving means within the casing and including an input member and a plurality of output members, several of such output members projecting outwardly through the first wall and at least one of such output members projecting outwardly through the second wall; a row-crop harvester unit mounted on the mounting face of the casing and including a pair of movable crop-removing elements and a movable gathering element; means drivingly connecting the crop-removing elements individually to the output members that project through the first wall; and means drivingly connecting the gathering element to the output member that projects through the second wall.

15. A row-crop harvester attachment, for a vehicle having a longitudinal body, comprising: a support positionable adjacent the body and having means thereon for the mounting thereof on the body, and further having a carrying portion for the carrying of row-crop harvester structure; said carrying portion including a casing on the support and provided with a first wall having a generally flat, external mounting face and with a second wall at an angle to said face; driving means within the casing and including an input member and a plurality of output members, one of such output members projecting outwardly through the first wall and one of such output members projecting outwardly through the second wall; a row-crop harvester unit mounted on the mounting face of the casing and including a pair of movable elements; means drivingly connecting one of the elements to the output member that projects through the first wall; and means drivingly connecting the other element to the output member that projects through the second wall.

16. A row-crop harvester attachment, for a vehicle of the type having a longitudinal body, comprising: a main support positionable adjacent the body and having means thereon for the mounting thereof on the body, said support including a casing having a forward wall generally transverse and upright as respects the body and a second wall substantially normal to and extending rearwardly from the first wall, said casing further having an adjoining casing portion laterally and upwardly offset from the second wall and including a top wall generally normal to the first wall; driving means within the casing, including a pair of output shafts projecting forwardly through the first wall below the level of the second wall, and an output shaft projecting upwardly through the top wall of the offset casing portion; row-crop harvester means including frame elements secured to the first wall of the casing to project forwardly therefrom, a pair of fore and aft extending crop-removing rolls respectively substantially coaxial with the pair of output shafts, and an endless chain extending fore and aft above the level of the crop-removing rolls and having a portion proximate to the aforesaid upwardly projecting output shaft; means connecting the crop-removing rolls respectively to said pair of output shafts; and means connecting the chain to said upwardly projecting output shaft.

17. The invention defined in claim 16, further characterized in that: the drive means includes a third output shaft projecting forwardly through the first wall below the level of the second wall; the row-crop harvesting unit includes a second endless chain spaced laterally from the first chain; and means is provided for connecting the second chain to the third forwardly extending output shaft.

18. The invention defined in claim 17, further characterized in that: said second chain extends rearwardly over the second wall and alongside the offset casing portion.

19. A crop-handling attachment, for a vehicle having a generally fore and aft extending frame or body, comprising: a main support having means for the mounting thereof on the body, and including a portion in the form of a casing provided with front, rear and top walls; drive means in the casing, including a pair of output elements accessible through the front wall; a crop-receiving unit behind the casing and including frame structure secured to the casing rear wall below the level of the casing top wall; a crop-handling unit ahead of the casing and including frame structure secured to the casing front wall below the level of the casing top wall; a movable crop-engaging device included in the crop-handling unit below the level of the casing top wall, and means for operatively connecting said device to one of the pair of output elements; and a crop-moving device extending fore and aft above the level of the casing top wall and having opposite end portions respectively associated with the crop-receiving and crop-handling units for moving crops from the latter to the former, and means for connecting said crop-moving device to the other of said pair of output elements.

20. A crop-handling attachment, for a vehicle having a generally fore and aft extending frame or body, comprising: a main support having means for mounting thereof on the body, and including a portion in the form of a casing provided with front, rear and top walls; drive means in the casing, including a pair of output elements accessible through the front wall, and a third output element accessible through the rear wall; a first crop-handling unit behind the casing and including frame structure secured to the casing rear wall below the level of the casing top wall; a second crop-handling unit ahead of the casing and including frame structure secured to the casing front wall below the level of the casing top wall; a movable crop-engaging device included in the first unit, and means for operatively connecting said device to the third output element; a movable crop-engaging device included in the second unit below the level of the casing top wall, and means for operatively connecting said device to one of the pair of output elements; and a crop-moving device extending fore and aft above the level of the casing top wall and having opposite end portions respectively associated with the first and second crop-handling units for moving crops from the second unit to the first, and means for connecting said crop-moving device to the other of said pair of output elements.

21. A crop-handling attachment, for a vehicle having a generally fore and aft frame or body, comprising: a main support having means for the mounting thereof on the body, and including a portion in the form of a casing having front and rear, generally upright walls and a top wall substantially normal to the upright walls; drive mechanism within the casing, including output means accessible through certain of said casing walls; front and rear crop-handling units disposed respectively ahead of and behind the casing and respectively including frame structures secured to the casing and further respectively having portions communicable across said casing top wall; crop-engaging means in the first unit and drivingly connected to the output means; crop-moving means extending fore and aft over the casing top wall and associated with said communicable portions to move crops from the front unit to the rear unit; and means drivingly connecting the crop-moving means to the output means.

22. A crop-handling attachment, for a vehicle having a generally fore and aft frame or body comprising: a main support having means for the mounting thereof on the body, and including a portion in the form of a casing having front and rear, generally upright walls and a top wall substantially normal to the upright walls; drive means within the casing, including output elements below the level of the top wall and accessible through certain of said upright walls; front and rear crop-handling units disposed respectively ahead of and behind the casing and respectively including frame structures secured to the casing and further respectively having portions communicable across said casing top wall; crop-engaging means in the first unit and drivingly connected to one of the aforesaid output elements; crop-moving means extending fore and aft over the casing top wall and associated with said communicable portions to move crops from the front unit to the rear unit; and means drivingly connecting the crop-moving means to another of the aforesaid output elements.

23. A crop-handling attachment, for a vehicle having a generally fore and aft frame or body, comprising: a main support having means for the mounting thereof on the body, and including a portion in the form of a casing having front and rear, generally upright walls and a top wall substantially normal to the upright walls; drive mechanism within the casing, including output means accessible through certain of said casing walls; front and rear crop-handling units disposed respectively ahead of and behind the casing and respectively including frame structures secured to the casing; a crop-carrying trough or floor extending fore and aft from the front unit and across the casing top wall to the rear unit; crop-engaging means included in the front unit and operative to discharge crops to said trough or floor; means drivingly connecting the crop-engaging means to the output means; crop-moving means cooperative with said trough or floor and extending rearwardly thereof to move crops from the front unit to the rear unit; and means drivingly connecting the crop-moving means to the output means.

24. An implement attachment, for a mobile frame having a power source, comprising: means including a casing positionable adjacent the frame; means for sustaining the casing on the frame; drive means contained in the casing and having input and output members; means for connecting the input member to the power source; implement means positionable adjacent the casing and extending therefrom and including a drivable part; means rigidly and removably sustaining the implement means as a cantilever on the casing; and means for removably interconnecting the drivable part and the output member.

25. A crop-harvesting attachment for a longitudinal frame movable forwardly over a field and having a power source, comprising means including a casing positionable adjacent the frame; means for sustaining the casing on the frame; drive means contained in the casing and having input and output means; means for connecting the input means to the power source; crop-gathering means positionable adjacent to the casing to extend forwardly from the casing and having a drivable part; means for rigidly and removably sustaining the crop-gathering means as a cantilever on the casing; means for separably interconnecting the drivable part and the output means; crop-receiving means positionable adjacent to the casing to extend rearwardly from the casing and having a drivable part; means for rigidly and removably sustaining the crop-receiving means as a cantilever on the casing; and means for separably interconnecting the output means and the drivable part of the crop-receiving means.

26. A row-crop harvester attachment, for a vehicle of the type having a longitudinal body provided with a power take-off element, comprising: a combined supporting and drive-means-carrying unit positionable alongside the body and having front and rear mounting faces of substantial area disposed transverse to the length of the body; means on the unit for mounting the unit on the body; crop-treating means including an elongated housing positionable lengthwise to extend rearwardly from the unit and having a front end receivable by a portion of the rear mounting face of the unit, and further including at least one movable crop-treating member having a forward end proximate to said rear mounting face; means for sustaining the front end of the crop-treating means on the rear mounting face of said unit; crop-gathering means positionable ahead of the unit and having a rear end to be received by the front mounting face of said unit, and further including a longitudinal crop-removing member having a rear end adjacent said front mounting face; means for rigidly sustaining the crop-gathering means at its rear end on the front mounting face of the unit; drive means within the unit and including a pair of shafts projecting respectively forwardly and rearwardly through front and rear mounting faces respectively in substantial longitudinal alinement with the crop-removing member and the crop-treating member, and further including a third shaft projecting exteriorly of said unit; and a plurality of individual connecting means for respectively connecting the shafts to the crop-removing member, the crop-treating member and the aforesaid power takeoff element.

27. An implement attachment for a vehicle of the type having a longitudinal body including a power takeoff element, comprising: a drive mechanism housing positionable alongside the body and having means thereon for the mounting thereof on the body; said housing having front and rear mounting faces; crop-gathering means having a rear mounting portion; means for rigidly sustaining the gathering means on the housing via the front face of the housing; crop-handling means positionable to extend lengthwise and rearwardly as respects the body, and including a mounting portion at its forward end; means for rigidly sustaining the crop-handling means on the housing via said front mounting portion and the rear face of the housing; drive mechanism in the housing, including a plurality of shafts projecting exteriorly of the housing; means for connecting one of the shafts to the gathering means; means for connecting another of the shafts to the crop-handling means; a drive shaft exteriorly of the housing and having opposite ends respectively adjacent the housing and the power take-off element; means for connecting one end of the drive shaft to one of the shafts of the housing; and means for connecting the other end of the drive shaft to the power take-off element.

28. An implement attachment, for a vehicle having a longitudinal body provided with laterally extending carrying structure, comprising: mounting means generally in the form of a box-like unit positionable alongside the body in longitudinally spaced relation to the carrying structure, and having a plurality of mounting portions, one of which is proximate to the body, a second of which is an implement-mounting portion, and a third of which faces toward the carrying structure; an elongated thrust member rigidly connected to said third mounting portion and extending toward and having an end proximate to the carrying structure, said end including means for connection to said structure to provide for vertical movement of the unit and member; crop-gathering means having a rear mounting portion; means for rigidly sustaining the crop-gathering means on the box-like unit via the implement-mounting portion of said unit; and means secured to the second mounting portion of the unit for association with the vehicle body to guide the member and unit and crop-gathering means during vertical movement of said member and unit and crop-gathering means relative to the vehicle body and carrying structure.

RUSSELL L. DORT.

References Cited in the file of this patent

UNITED STATES PATENTS

| Number | Name | Date |
|---|---|---|
| Re. 23,083 | Andrews | Feb. 8, 1949 |
| 1,116,278 | Hollis | Nov. 3, 1914 |
| 1,729,648 | Mitchell | Oct. 1, 1929 |
| 1,755,524 | Stanfield | Apr. 22, 1930 |
| 1,809,149 | Szekely | June 9, 1931 |
| 1,840,336 | Threewitts et al. | Jan. 12, 1932 |
| 2,115,517 | Capps | Apr. 26, 1938 |
| 2,120,040 | Phillips | June 7, 1938 |
| 2,291,987 | Rogers | Aug. 4, 1942 |
| 2,334,415 | Koeller | Nov. 16, 1943 |
| 2,416,731 | Baldwin | Mar. 4, 1947 |